Aug. 25, 1925.
A. M. WOLF
1,550,862
INTERNAL COMBUSTION ENGINE AND METHOD OF OPERATING THE SAME
Filed June 4, 1918
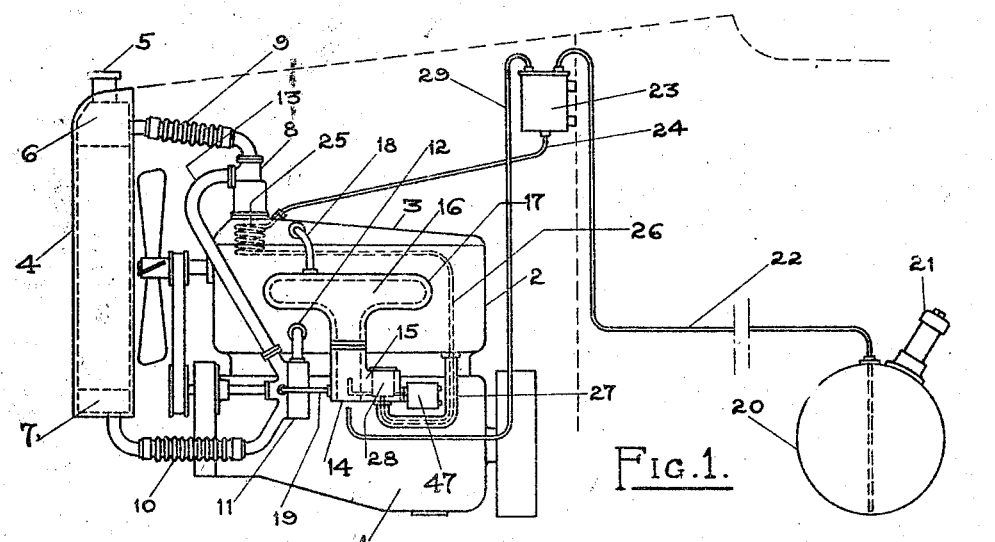
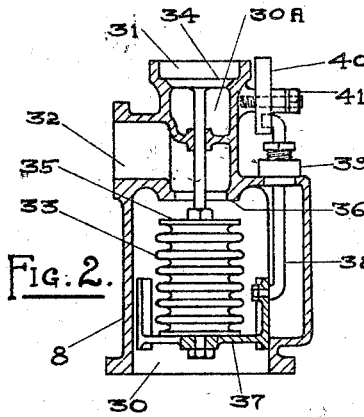
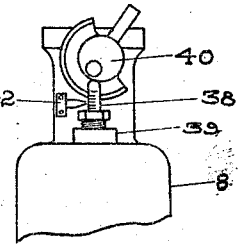
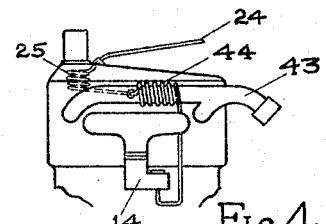
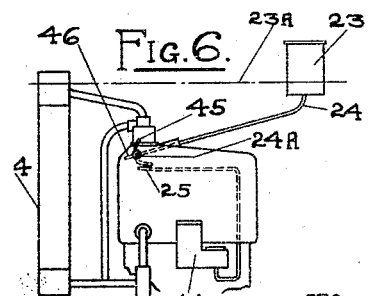
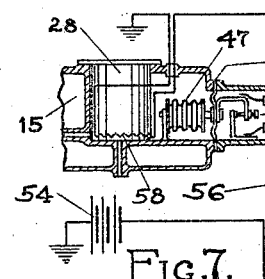
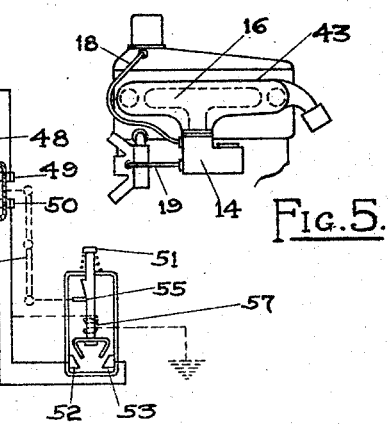
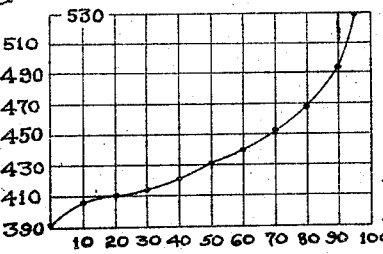
WITNESSES:
INVENTOR.
Austin M. Wolf.
BY
ATTORNEY.

Patented Aug. 25, 1925.

1,550,862

UNITED STATES PATENT OFFICE.

AUSTIN M. WOLF, OF PLAINFIELD, NEW JERSEY.

INTERNAL-COMBUSTION ENGINE AND METHOD OF OPERATING THE SAME.

Application filed June 4, 1918. Serial No. 238,084.

*To all whom it may concern:*

Be it known that I, AUSTIN M. WOLF, a citizen of the United States, and resident of Plainfield, in the county of Union, in the State of New Jersey, have invented certain new and useful Improvements in Internal-Combustion Engines and Methods of Operating the Same, of which the following is a description.

It is the object of the invention to make internal combustion engines more economical and efficient, and more particularly to provide improvements in the cooling and fuel system of such engine, and especially to provide for the efficient use of low grade fuel such as kerosene, coal oil, etc.

The efficiency of the internal combustion engine is quite low, based on the number of heat units in the fuel consumed, and the power delivered by the engine. In a well designed engine an efficiency of 21% has been obtained, this being a four cycle automobile type engine. In the Diesel engine it is possible to obtain an efficiency of about 35%, this increase being due to the inherent cycle of the Diesel engine, in which much higher temperatures are obtained. The internal combustion engine is a heat engine and the more heat that can be conserved, the greater will its thermal efficiency be. For instance in the present type of water cooled engine, 35.8% of the fuel value is given up to the cooling water, and 35.6% to the exhaust gas and lost by direct radiation. It is desirable to minimize these losses and it is my object to conserve a great deal of the heat heretofore lost to the cooling water.

Everyone is familiar with the fact that a cold engine cannot deliver its full power and that it is uneconomical on fuel. This has led to the use of thermostats in the water circulating system, to maintain during operation of the engine a temperature of 175°–180° in the engine jacket. For automobile use, for instance, it is not advisable to get any nearer than this to the boiling point of water, due to the use of alcohol in the cooling system with the water, to prevent the latter from freezing in winter. A higher maintained temperature would result in the alcohol being boiled out of the solution. Attempts have been made to keep just under the boiling point of water, or at it, but this introduces such complications as multiple cooling systems, condensers, undue water consumption, the latter being prohibitive in such instances as automobile and aviation use.

Another means of attaining a higher heat range, is by the use of the air cooled motor, which has its limitations also. For small power, it will perform well. When a certain cylinder size is reached, it has been found impossible to properly cool the engine. However the air cooled engine has proven the wonderful economy of an engine working at a temperature higher than is possible with water cooling. It is necessary, in order to obtain better thermal efficiency to depart from water cooling, and this I propose to do, by the use of other suitable liquids, and by working at a temperature higher than is possible with water cooling, and maintaining the temperature substantially constant. The latter point is very essential, and particularly in conjunction with the use of low grade fuels. Exhaust heat has been used in conjunction with low grade fuel carburetion, but its disadvantage is its varying temperature and the impossibility of adequately controlling it. A higher temperature operating engine can not only aid carburetion by lending uniform heat to the fuel feed mechanism, but helps maintain the mixture suitably heated till it gets into the cylinder.

With low grade fuels it is important to obtain a temperature that will give efficient carburetion and furthermore to maintain the temperature constant within a small margin. The fuels of higher volatility are not subject to the necessarily close limits of temperature in order to secure their vaporization and a uniform mixture, but as the fuels become denser, the necessity of maintaining the temperature within close limits becomes greater. This is due to the variation in viscosity and the fact that flow of the fuel through the carbureter jet orifice is impeded as the viscosity increases. A carbureter, when designed to handle a definite fuel, can handle it properly only when the fuel is at a temperature which will allow the jet flow to be in accordance with the calculations that were made in the design of the particular jet orifice. A drop in temperature of the fuel will therefore cause the jet to offer an undue resistance to the flow of the fuel and the carbureter becomes entirely unbalanced. It is therefore essential to provide a method of obtaining the necessary temperature for the most efficient carburetion, and furthermore to maintain this temperature within very close limits. This is one of the objects of my invention.

It may be said that heretofore, in endeavoring to feed fuel to engines, the engines and their auxiliaries were built, and then attempts were made to adapt the fuel to the engine. This is true of present day attempts at low grade fuel carburetion. A carburetor or manifold, or both, applied to a present day engine, in the attempt to use kerosene, for instance, cannot solve the fuel problem. The only solution is to build the engine around the fuel, so to say; and the present invention has been made with the idea of solving the fuel problem in this way by providing the engine with a fuel supply system adapted for supplying low grade fuel heated to the most suitable temperature and with a cooling system for maintaining an efficient high engine temperature and for affording the necessary controlled uniform heat for heating the fuel liquid to a constant temperature, other parts of the engine being also adapted to withstand the high operating temperature. For example, operating my engine at a higher temperature, I naturally require greater piston clearance. To allow the use of this temperature, I would use a thorough lubricating system, such as the full pressure system, the oil being fed through the crankshaft to the connecting rod big end, from the latter to the wrist pin, and thence to the cylinder walls. Such precautions are necessary, and result in a specially built engine for the purpose in mind. As I intend to use low grade oils, the base of my cylinder jackets will be provided with sediment pockets, there being cover plates to give access to the latter. In this way, any sediment and gummy residue can be removed periodically. The radiator, instead of being a honeycomb or cellular type, could be of the tubular type, and be provided with a good sediment space or trap in the lower well.

These points and further consideration of the fuel problem will be considered with reference to the drawings forming a part of this specification, in which:

Fig. 1 is a schematic representation of a cooling and fuel system embodying the invention;

Figs. 2 and 3 show a thermostatic valve control forming a detail of the arrangement shown in Fig. 1;

Figs. 4, 5 and 6 are diagrammatic views of modifications of the arrangement shown in Fig. 1;

Fig. 7 discloses an electric heating device for starting the engine; and

Fig. 8 is a distillation curve for kerosene.

In the drawings, and referring first to Fig. 1, 1 represents an internal combustion engine with the jacket 2, with the header or upper portion 3. A radiator 4 is provided, having the filler cap 5, upper tank 6 and lower tank 7. A thermostatic valve control unit 8 is located above, and in communication with the header 3. The passageway 9 brings the upper radiator tank 6 in communication with thermostatic valve device 8. From the lower tank 7, the passageway 10 leads to the pump 11, which discharges through pipe 12 into the jacket 2. The bypass or passageway 13 runs from the device 8 to pump 11, and as will be explained later, the normal circulation of the cooling medium is from jacket 2, through passageway 9, through the radiator, and back to the jacket 2 through passageway 10, pump 11 and pipe 12. The cooling medium, however, can be short-circuited under certain conditions through the pipe 13.

The carburetor 14 is provided with the jacket 15, which completely surrounds the mixing and float chambers. The intake pipe 16 has the jacket 17 surrounding it. It is fed through pipe 18 with the cooling medium, which surrounds the intake pipe and passes on to the carburetor jacket 15, returning to the pump 11 through pipe 19. The pipe 18 could be dispensed with by providing openings in jacket 17 where the latter bolts to the cylinder, matching with openings in the jacket wall of the cylinders to correspond.

The fuel tank 20, with its filler cap 21, may be located in any convenient place. It is here shown below the carburetor level and hence requires a fuel elevating device. The fuel is conveyed through pipe 22 to the elevating device or pump 23. The latter may be of any desirable type; for instance the Stewart-Warner system. With this system, the drawing does not indicate the suction pipe for its operation. From tank 23, the fuel is conveyed through the sloping pipe 24, to the coil 25. The latter is located in the header 3 and just below device 8; being located where the hottest portion of the cooling medium would be. The fuel is then conveyed to the carburetor through pipe 26, which may run inside the jacket, as shown, or may be wrapped in heat insulating material to conserve its heat. The heat insulating material 27 protects pipe 26 between the jacket and carburetor 27, and if desired, a jacket could be formed around pipe 26, and incidentally feed the carburetor jacket with the hot cooling medium. It will be seen that the heat of the cooling medium is imparted to the fuel, this heat being conserved therein as it is conveyed to the float chamber 28, and the fuel is there maintained in the heated condition by the carburetor jacket. The vent pipe 29, of the tank 23, runs as shown to just below the carburetor air intake. Should any vapor be given off by the fuel in coil 25, it will rise in pipe 24 to tank 23, and then passing through pipe 29, would be consumed by the engine. The amount of vapor given off would be very slight, and to all intent vent 29 could be directly open to the atmosphere. However to prevent any smell of the fuel, if for instance kerosene were used, reaching the nose of the operator, which would be undesirable in the case of an automobile, the vapor is led to the carburetor. Such a condition would be possible with an automobile at rest and the engine idling. The end of pipe 29 is sufficiently far away from the suction of the carburetor not to cause any depression in tank 23. Pipe 29 simply leads any vapor that might come off, so it will be caught by the carburetor.

In order to have a cooling medium that will serve above 212° F., I propose to use the various heavy petroleum distillates, depending on the temperature desired, which in turn is dependent on the fuel used. Other liquids might be available, but the petroleum distillate is most readily obtained and is inexpensive. For instance kerosene can be used, and as with it will be shown later, a temperature of 350° F. may be maintained in the jacket. Besides, the use of such a cooling medium prevents jacket scale, a common source of trouble to-day, impeding the heat flow through the cylinder walls to the cooling medium. Besides, a radiator containing such a cooling liquid, cannot freeze in winter.

Referring to Figs. 2 and 3, the thermostatic unit 8 has the opening 30 communicating with the jacket of the engine; opening 31 with connection 9; and opening 32 with pipe 13. Any type of thermostat or heat responsive means or element may be used with my invention, but the type I prefer and show, consists of the cylindrically corrugated, expansible member 33. The valve 34, seating in casting 8, is secured by its valve stem to member 33. As the latter expands, valve 34 becomes unseated, and when the maximum expansion possible takes place, the disc 35 seats against the face 36, thereby preventing communication between passageways 30 and 32. Passageway 30 is continually in communication with chamber 30^A, by a cored passageway not shown in the drawing. Inside the member 33 is a liquid which volatilizes when a certain temperature is reached, thus causing expansion of member 33. The cooling medium continually surrounds member 33, which for example is made so that at 350° F. it has expanded its available stroke. It will therefore be seen that when the cooling medium is under this temperature, a condition will exist as shown in the drawing. The cooling medium will circulate from passageway 30 to 32, which means that on the engine it will be by-passed through pipe 13. The latter is preferably jacketed, passes through jacket 2, or is wrapped with heat insulating material. No heat is then given up by the cooling medium, but it absorbs heat from the cylinder walls, till the set temperature is reached. If such temperature be exceeded, the flow of the cooling medium is from passageway 30 to port 31, and thence through the radiator. In this way, the thermostatic unit maintains the cooling medium at a substantially constant temperature.

The by-pass method described is only one of many ways that the cooling medium's temperature can be controlled. For instance, the unit 33 could be made to cut in and out the circulating pump 11, and to control its speed. Also, when below temperature, the cooling medium could be at rest in the jackets, and circulation maintained through the radiator and by-pass. The device 8 could be placed in the passageway 10 if desired, being acted on by the temperature of the entering cooling liquid. Knowing the temperature rise of the cooling liquid in passing through the engine, the element 33 would be set accordingly.

The lower end of unit 33, Figs. 2 and 3, is secured to the member 37, which may be adjusted up or down, by rod 38. Member 37 is of spider form, not hindering circulation of the cooling medium. Passing through the stuffing box 39, rod 38 is raised or lowered by the eccentric 40, which when adjusted, is held locked in place by nut 41. A pointer 42 indicates on a calibrated portion of rod 38, the temperature for which the unit 33 is set. It will be seen that by depressing spider 37 and elongating member 33, that it will require a higher temperature to cause disc 35 to seat against face 36. A readily adjustable means is thus provided to regulate the temperature of the engine, within a certain range. This is desirable in the use of various fuels, to adapt the engine to the best working temperature of the particular fuel being used. The stuffing box 39 may be eliminated by extending the rod 38 within a tube to above the level of the liquid in tank 6.

Fig. 4 shows an arrangement whereby the fuel is subjected to a secondary heating by exhaust heat before being fed to the carburetor. It can be subjected to exhaust heat in any desirable way. Around exhaust pipe 43, for instance, is the coil 44 in the pipe leading from the coil 25 to the carbureter. Fig. 5 showns means for heating the gases coming from the carburetor, by exhaust heat, if desired in place of the heat of the cooling medium. The exhaust pipe 43 surrounds the intake pipe 16.

Fig. 6 shows a combination of features of my present invention and features of my application Serial No. 226,019. In the latter, the fuel is circulated in the engine jackets. My present application embodies separate circuits of the fuel and cooling mediums, so that any fuel may be used and with a different cooling medium. A combination is shown in Fig. 6, in which the same liquid may be used for fuel and for cooling.

Between pipe 24 and coil 25 is the valve 24A. In operating independent fuel and cooling systems, the fuel would pass from pipe 24 to coil 25 and on to the carburetor. Moving the valve 24A to provide common fuel and cooling liquid, pipe 24 empties into the jacket through pipe 46, and fuel goes to the carburetor from pipe 45. With this latter condition, the jackets and cooling system will be filled to full capacity, after which the engine could run as before, or either way. Tank 23 is located so as to preserve the proper level, as level line 23A. It can be built so there will be a minimum variation in level, or to provide an absolutely constant level. For certain uses, such as automobile, etc., tank 23 would be placed close to radiator 4.

In Fig. 7, the float chamber 28 is enlarged to accommodate the thermostatic unit 47. The thermostatic device is shown in Fig. 1 as an attachment, but it is preferably built into the carburetor. Unit 47 as shown in Fig. 7 is anchored at one end and secured to diaphragm 48 at the other, which diaphragm also supports a movable contact point, electrically connected with binding post 49. Binding post 50 is connected with the stationary point positioned to make contact with the movable contact point. Switch 51, when depressed when starting the engine, closes the circuit between contacts 52 and 53, allowing current to flow from battery or energy source 54 to post 50. When the contents of float chamber 28 are cold, unit 47 is contracted, whereby the contact points close the circuit between posts 49 and 50. Current then passes into heating coil 58, raising the fuel temperature till the required heat is reached, whereupon unit 47 expands and opens the circuit. To obviate the necessity of holding switch 51 closed during this operation, and so that it will be in its proper position for subsequent operation, the latch 55 is provided which holds the switch closed during the heating operation and is released by unit 47 by means of lever 56 when the unit expands or the solenoid 57 may be used to hold the switch closed during the heating process, releasing same when the contact points of posts 49 and 50 are separated by unit 47.

Figure 8 is a distillation curve of present day kerosene, in which degrees Fahrenheit are plotted against percentage of distillation. It will be seen that kerosene begins to distill off at about 392° F. With a thermostat set at 350° F., there will be no danger of the cooling medium, if kerosene, distilling off. Denser fuels, such as coal oil, have higher curves and it will thus be seen that if coal oil were used as a cooling medium, a higher temperature could be maintained. The only limit is that at which the lubricating oil in the cylinder would break down.

Besides thermal efficiency, the high temperature imparted to the fuel aids its carburetion by supplying it with heat necessary to overcome some of the latent heat of vaporization. The working temperature of the engine takes into account the initial distilling point of the fuel as well as of the cooling medium. The gas passageways in the engine being heated so much more than in a water cooled engine, aids the gases on their way to the cylinder. Kerosene carburetion, for instance, is hampered in the water cooled engine, due to the hot gases coming in contact with the relatively cool walls of the gas passageways, tending toward condensation.

In regard to the thermostatic unit 33, Fig. 2, such a unit is on the market at the present time. It is filled with a solution of alcohol and ether, and the manufacturers of same can provide for any temperature up to 250° F. The temperatures I propose to use are considerably above this. In order to make an expansive member responsive to my high temperatures, I propose filling same with a petroleum distillate, such as gasoline, or kerosene, or a mixture of both.

In present cooling systems, hose connections are made use of, which would be entirely unsuitable for my system. I therefore propose to make the connections 9 and 10, Fig. 1, of metallic tubing, with circumferential (or spiral) corrugations as shown, which would allow for flexibilty between engine and radiator, and take care of an misalignment between them.

The invention is applicable to all types of internal combustion engines; for instance, for motor vehicle, tractor, aviation, stationary and marine work. In the latter case, the radiator would be replaced by a submerged tank or coil of pipe.

I deem it advisable, as seen from the previous text, to keep below the initial distilling point of the fuel used. I propose, for instance, a temperature of 350° to be maintained in the engine jackets and to be imparted to the fuel, in the case of kerosene having an initial distilling point of about 390°. It is of course possible to go above the initial distilling point of the fuel, by utilizing the vent pipe 29 or an equivalent vent conveying the primary vapors to the carburetor or engine, and I wish the scope of this application to include such an arrangement. Inter-relating means would be provided between the vent pipe and the carburetor mechanism to maintain a constant resultant mixture to the engine. The cooling medium would of course be kept below its initial distilling point to prevent loss of same. Assuming the above example of kerosene fuel, a lower petroleum distillate such as coal oil would be used for the cooling medium. In the event of the cooling medium being carried above its initial distilling point, this would be provided for as shown in my co-pending application Serial No. 226,019.

Further use of the vent pipe can be had, for instance, in starting. A very volatile fuel could be introduced into tank 23 when starting and the vapors carried to the engine through pipe 29, affording the complete starting mixture or being over-rich is diluted with air at the entrance of or in the carburetor, the fuel supply of the latter being cut off while tank 23 acts as a carburetor. Or the introduction of a volatile fuel through the means of valve 24$^A$, Fig. 6, into the enclosed fuel line, can also be used as a starting expedient, the vapors rising in pipe 24 to tank 23, and then conveyed to the engine by the vent pipe.

It is to be understood that in referring to initial distillation temperature it is not intended to imply that the invention is limited to the use of liquids requiring an increasing temperature for distilling of successive portions therefrom, that is, the expression would apply to a liquid that distills at a fixed temperature, if there be any such liquid other than water.

Having described my invention, what I claim is:

1. A cooling and fuel-supply system for internal combustion engines, comprising means for causing a cooling liquid having an initial distillation temperature above 212° F. to circulate through a cooling passage of the engine cylinder, means for maintaining the cooling liquid at a substantially constant temperature above 212° F. and below its initial distillation temperature, means for supplying liquid fuel to the fuel feeding means of the engine, and means for heating the fuel by the transfer of heat from the heated cooling liquid.

2. A cooling and fuel-supply system for internal combustion engines, comprising means for causing a cooling liquid having a high initial distillation temperature to circulate through a cooling passage of the engine cylinder, means for maintaining the cooling liquid at a substantially constant temperature considerably above 212° F., means for supplying to the fuel feeding means of the engine a liquid fuel having an initial distillation temperature substantially higher than 212° F., and means for transferring heat from the heated cooling liquid to the fuel liquid to heat the fuel liquid to a temperature near its initial distillation temperature 3. A cooling and fuel-supply system for internal combustion engines comprising means for causing a cooling liquid having a high initial distillation temperature to circulate through a cooling passage of the engine cylinder, means for maintaining the cooling liquid at a temperature considerably above 212° F., a carbureter, means for supplying to the carbureter a liquid fuel having an initial distillation temperature much higher than that of water, and means for transferring heat from the heated cooling liquid to the fuel liquid flowing to the carbureter to heat the fuel liquid to a temperature near but below its initial distillation temperature.

4. A cooling and fuel-supply system for internal combustion engines, comprising means for causing a cooling liquid having a high initial distillation temperature to circulate through a cooling passage of the engine cylinder, means for maintaining the cooling liquid at a substantially constant temperature considerably above 212° F., a carbureter, means for supplying to the carbureter a liquid fuel having an initial distillation temperature much higher than that of water, and means for heating the fuel flowing to the carbureter by the transfer of heat from the heated cooling liquid.

5. A cooling and fuel-supply system for internal combustion engines, comprising means for causing a cooling liquid having a high initial distillation temperature to circulate through a cooling passage of the engine cylinder, means for maintaining the cooling liquid at a substantially constant temperature considerably above 212° F., a carbureter, means for supplying to the carbureter a liquid fuel having an initial distillation temperature much higher than that of water, means for transferring heat from the heated cooling liquid to the fuel liquid flowing to the carbureter to heat the fuel liquid to a temperature near its initial distillation temperature, and means for transferring heat from the heated cooling liquid to the fuel inlet pipe leading from the carbureter.

6. A cooling and fuel-supply system for internal combustion engines, comprising means for causing a cooling liquid having a high initial distillation temperature to circulate through a cooling passage of the engine cylinder means for maintaining the cooling liquid at a substantially constant temperature considerably above 212° F., a carbureter, means for supplying to the carbureter a liquid fuel having an initial distillation temperature much higher than that of water, means for transferring heat from the heated cooling liquid to the fuel liquid flowing to the carbureter to heat the fuel liquid to a temperature near its initial distillation temperature, and means for transferring heat from the heated cooling liquid to the carburetor.

7. The combination with an internal combustion engine cylinder, of means for supplying to the inlet passageways of the cylinder a fuel-air mixture made from a fuel liquid having an initial distillation temperature much higher than that of water, and a cooling system for maintaining said inlet passageways at a temperature near the initial distillation temperature of the fuel liquid, said cooling system comprising means for causing a cooling liquid having an initial distillation temperature much higher than that of water to circulate through a cooling passage of the engine cylinder and pass the walls of the inlet passageways, and means for maintaining the cooling liquid at a substantially constant predetermined temperature considerably above 212° F. and below its initial distillation temperature.

8. A cooling and fuel supply system for internal combustion engines, comprising means for causing a cooling liquid having an initial distillation temperature considerably above 212° F. to circulate through a cooling space between the engine cylinder and a jacket, means for maintaining the cooling liquid at a substantially constant temperature considerably above 212° F., a carburetor, and a fuel conduit for supplying to the carburetor liquid fuel having an initial distillation temperature above 212° F., said conduit comprising a portion located in the engine jacket.

9. A cooling and fuel supply system for internal combustion engines, comprising means for causing a cooling liquid having an initial distillation temperature considerably above 212° F. to circulate through a cooling space between the engine cylinder and a jacket, means for maintaining the cooling liquid at a substantially constant temperature considerably above 212° F., a carburetor, and a fuel conduit for supplying to the carburetor liquid fuel having an initial distillation temperature above 212° F., said conduit comprising a coil located in the engine jacket.

10. A cooling and fuel-supply system for internal combustion engines, comprising means for causing a cooling liquid having a initial distillation temperature above 212° F. to circulate through a cooling passage of the engine cylinder, means responsive to variations in temperature of the cooling liquid for maintaining the liquid at a substantially constant predetermined temperature above 212° F. and below its initial distillation temperature, a conduit for supplying to the fuel feeding means of the engine liquid fuel having an initial distillation temperature above 212° F., and means for transferring heat of the cooling liquid to fuel in said conduit to heat the fuel to a substantially constant predetermined temperature above 212° F. and below its initial distillation temperature.

11. A cooling and fuel-supply system for internal combustion engines, comprising means for causing a cooling liquid having a high initial distillation temperature to circulate through a cooling passage of the engine cylinder, means for maintaining the cooling liquid at a substantially constant temperature considerably above 212° F., a carburetor, a supply system for supplying liquid fuel to the carburetor, means for heating the fuel in the supply system by the transfer of heat from the heated cooling liquid, and means for supplying vaporized portions of the fuel from the supply system to the carburetor.

12. A cooling and fuel-supply system for internal combustion engines, comprising means for causing a cooling liquid having a high initial distillation temperature to circulate through a cooling passage of the engine cylinder, means for maintaining the cooling liquid at a substantially constant temperature considerably above 212° F., a carburetor, a supply system for supplying liquid fuel to the carburetor, means for heating the fuel in the supply system by the transfer of heat from the heated cooling liquid, and a conduit leading from a space in the supply system to the air intake of the carburetor for supplying vaporized fractions of fuel from the supply system to the carburetor.

13. A cooling and fuel-supply system for internal combustion engines, comprising means for causing a cooling liquid having a high initial distillation temperature to circulate through a cooling passage of the engine cylinder, means for maintaining the cooling liquid at a substantially constant temperature considerably above 212° F., a supply system for supplying liquid fuel to fuel feeding means of the engine, means for heating fuel in the supply system by the transfer of heat from the heated cooling liquid, and means for causing vaporized fractions of fuel from the fuel feeding system to be consumed in the engine.

14. A cooling and fuel supply system for internal combustion engines, comprising a circulation system adapted for the circulation of a fuel liquid for cooling the engine, a carburetor, a fuel supply conduit leading into said circulation system and thence to the carburetor, whereby fuel in its passage from the fuel supply to the carburetor will be heated by the transfer of heat from the heated cooling liquid, and controlling means whereby the fuel from the fuel supply may be supplied to the circulation system and fuel from the circulation system supplied to the carbureter.

15. A cooling and fuel-supply system for internal combustion engines, comprising a circulation system, means for maintaining a cooling liquid having a high initial distillation temperature in said circulation system at a temperature much higher than the initial distillation temperature of water, means for supplying fuel having an initial distillation temperature above 212° F. to the engine, and means for heating the fuel and for maintaining it at a temperature near its initial distillation temperature until it enters the engine cylinder by heat of the cooling liquid.

16. The combination with an internal combustion engine, of means for supplying to the engine a liquid fuel having an initial distillation temperature substantially above 212° F., carbureter means for utilizing some of the heat energy of the products of combustion to heat a liquid, means for transferring heat from the heated liquid to the fuel liquid flowing to the carburetor to heat the fuel to a temperature near its initial distillation temperature and means for maintaining the temperature of the fuel liquid substantially constant.

17. A cooling and fuel-supply system for internal combustion engines, comprising means for causing a cooling liquid having a high initial distillation temperature to circulate through a cooling passage of the engine cylinder, means for maintaining the temperature of the cooling liquid substantially above 212° F., means for supplying fuel to the engine, means for heating the fuel by the transfer of heat from the heated cooling liquid, auxiliary heating means for heating the fuel when starting, and means for automatically putting said auxiliary heating means out of operation when the fuel has been sufficiently heated.

18. The method of operating an internal combustion engine, which comprises transferring heat from the cylinder walls of the engine to a cooling liquid having an initial distillation temperature above 212° F., maintaining the cooling liquid at a substantially constant temperature above 212° F. and below its distillation temperature, supplying to the fuel feeding means of the engine a fuel liquid having an initial distillation temperature above 212° F., and heating said fuel liquid by the transfer of heat from the heated cooling liquid.

19. The method of operating an internal combustion engine by means of liquid fuel having an initial distillation temperature substantially above 212° F. which comprises cooling the cylinder walls of the engine by the circulation through cooling passages of the engine of a cooling liquid having an initial distillation temperature above 212° F., and maintaining the cooling liquid at a substantially constant temperature above 212° F. and below its initial distillation temperature, and transferring heat from the heated cooling liquid to the fuel liquid to heat the fuel liquid to a temperature near its initial distillation temperature.

Whereunto I affix my signature.

AUSTIN M. WOLF.